May 25, 1965 C. A. SUMTER 3,185,921
COMBINATION BATTERY CARRIER AND VOLTMETER
Filed Aug. 10, 1961 2 Sheets-Sheet 1
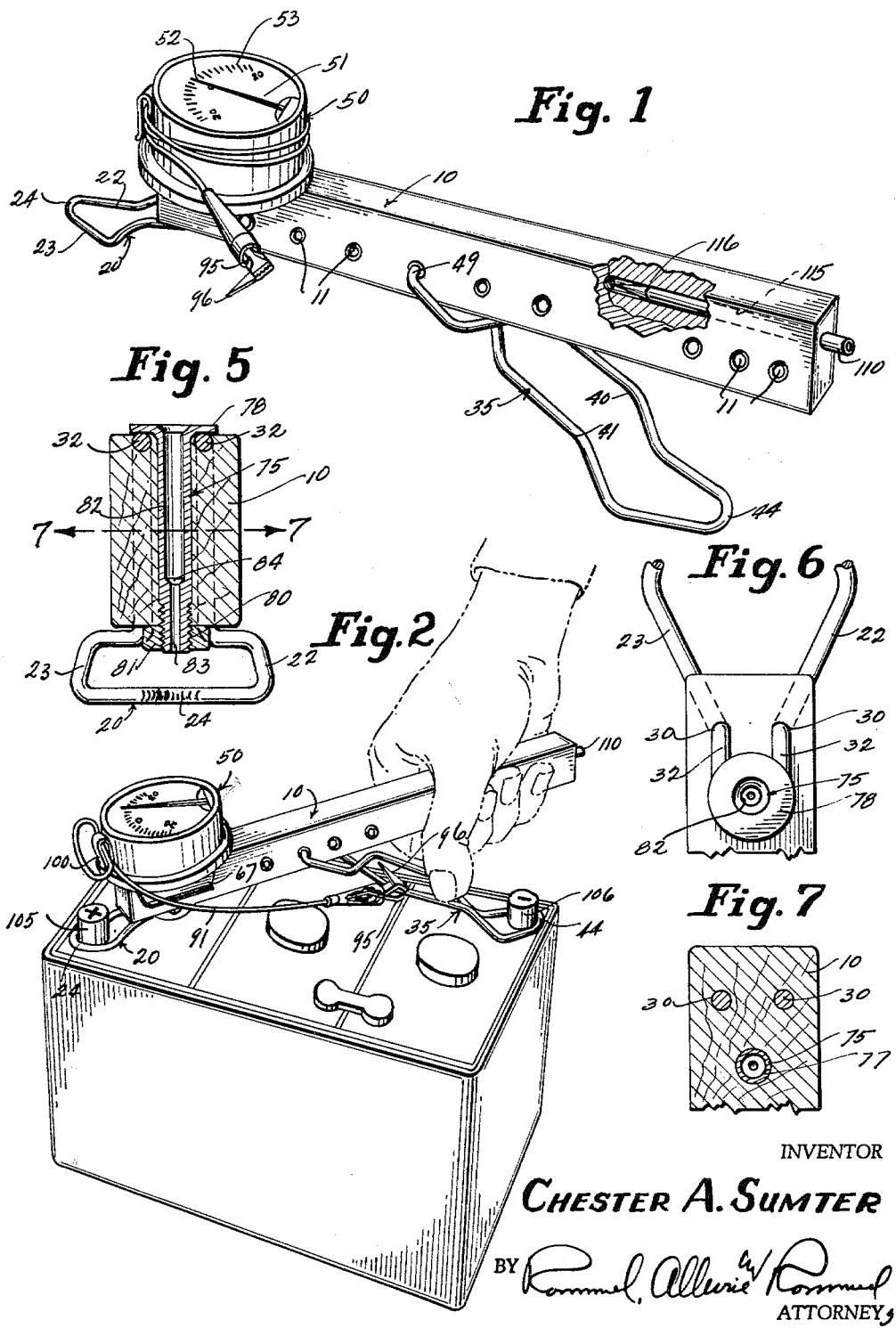
INVENTOR
CHESTER A. SUMTER
BY
ATTORNEYS

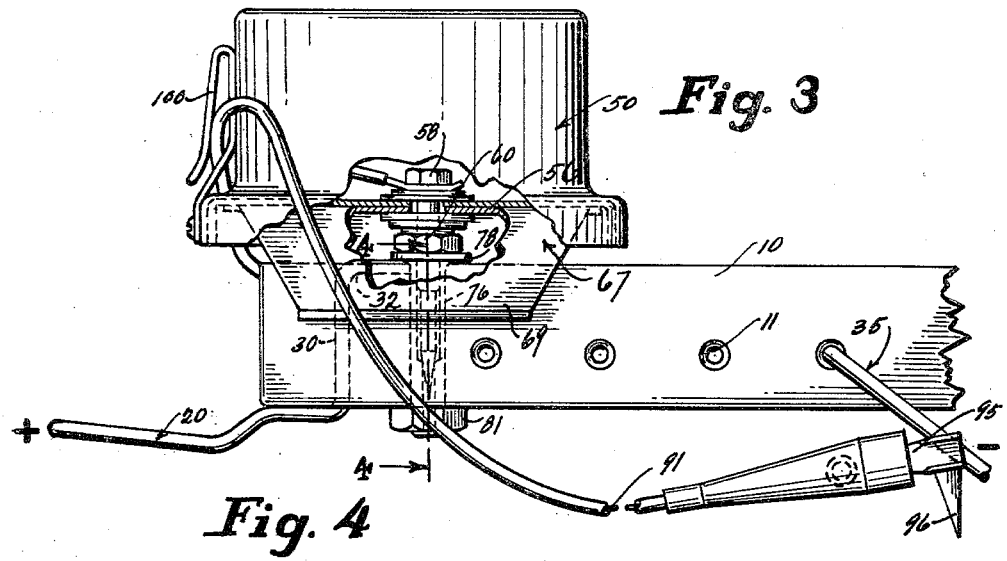
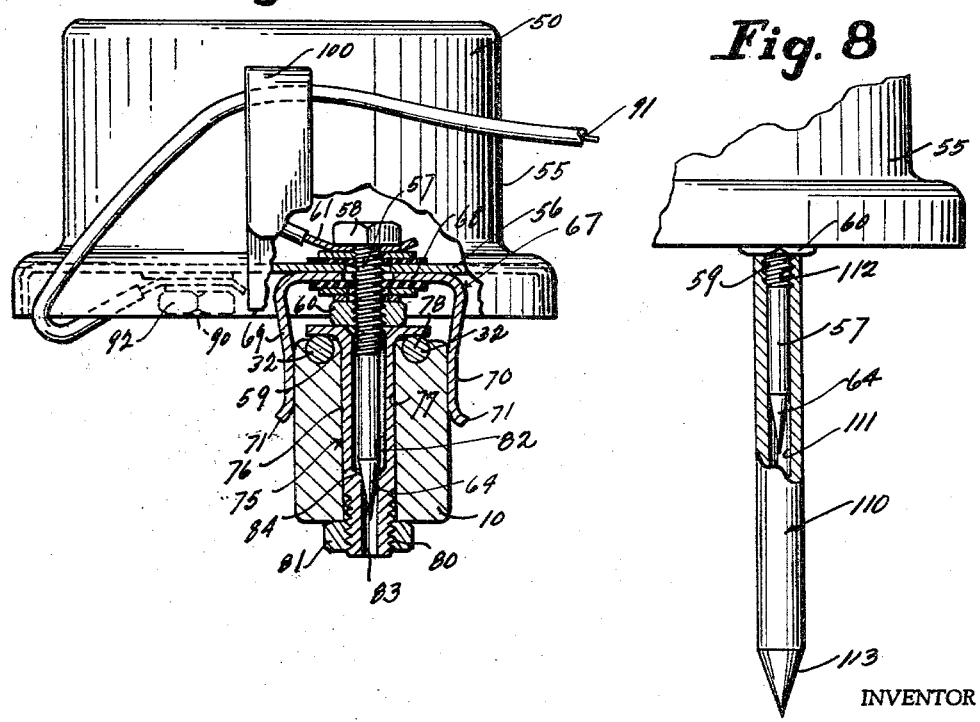

United States Patent Office 3,185,921
Patented May 25, 1965

3,185,921
COMBINATION BATTERY CARRIER AND VOLTMETER
Chester A. Sumter, Rte. 11, Knoxville 18, Tenn.
Filed Aug. 10, 1961, Ser. No. 130,687
8 Claims. (Cl. 324—29.5)

This invention relates to a combination battery carrier or lifter and voltmeter attachment associated therewith in such manner that a quick reading can be made by an individual at the time of lifting and transporting the battery.

The primary object of this invention is the provision of a unitary combination battery carrier and voltmeter adapted to serve the purpose of lifting and supporting batteries for tranpsort and at the same time enabling a reading of the voltage of the battery being carried. Primarily, the carrier may be of the types set forth in my U.S. Patents 2,435,549, dated February 3, 1948 and 3,059,953, dated October 23, 1962, the voltmeter having terminal connections which enable the battery post attaching portions to serve as electrodes for connection to battery posts.

A further object of this invention is the provision of an improved voltmeter having associated parts which enable its conventional use in the testing of batteries in that it has prods for connection to the plus (+) and minus (−) posts of the battery and terminals which can be associated with the post attaching elements of the battery carriers and lifters aforesaid.

In the drawings, wherein for the purpose of illustration is shown only a preferred embodiment of the invention:

FIGURE 1 is a perspective view of the improved combination battery carrier and voltmeter.

FIGURE 2 is a view of the carrier in use, showing an operator lifting the battery, with the volt meter in position to enable the operator to instantly read the voltage of the battery being carried.

FIGURE 3 is a fragmentary side elevation of the voltmeter end of the carrier.

FIGURE 4 is a fragmentary cross sectional view taken substantially on the line 4—4 of FIGURE 3.

FIGURE 5 is a cross sectional view of a socket portion of the carrier adapted to receive a terminal prong of the voltmeter.

FIGURE 6 is a fragmentary plan view of the end of the carrier showing one of the battery attaching posts and associated details.

FIGURE 7 is a fragmentary cross sectional view taken substantially on the line 7—7 of FIGURE 5.

FIGURE 8 is a fragmentary view of the voltmeter showing an extension prod useable therewith.

Generally, the carrier, as described in my U.S. Patent 3,059,953, dated October 23, 1962, comprises an elongated member 10 preferably of some insulation material, such as plastic or wood, which may conveniently be referred to as a handle. It is provided with a series of transversing openings 11 therein relatively spaced therealong and extending from side to side. These openings 11 are adapted to form sockets for receiving studs of a lifting member 35 of conducting material, which may also serve as an electrode. This lifting member 35 is swingably detachable with respect to the handle. It is of a tong-like construction comprising a pair of legs 40 and 41 which at their outer ends are provided with convergent portions 42 and 43, terminating in a bight 44 adapted to grip and be connected to a battery post. The legs 40 and 41, remote from the bight 44, are provided with obliquely angled portions which cross each other in X-shaped relation, as set forth in my above identified co-pending application, and which, at their outer ends, are provided with parallel attaching studs or portions 49 adapted to enter opposite sides of the selected passageway 11. The lifting member 35, in the case of the carrier shown in the drawings, is formed of wire and since the bight 44 resiliently connects the legs 40 and 41, the legs 40 and 41 may be sequeezed together to disconnect the member 35 from the handle 10 in order to adjust it to any position along the handle in a desired opening 11 for the purpose of conforming to the size of battery to be carried. A fixed terminal post attaching lifting member or electrode 20 is also provided. It is of wire and electrically conductive. It includes a post inserting loop portion provided with side strands or portions 22 and 23 which converge outwardly and are connected by a bight portion 24. The strand portions 22 and 23 extend beyond the handle 10 and, remote from the bight portion 24, they extend for a short distance beneath the handle 10, as shown in FIGURE 3 of the drawings and then extend upwardly in right angled relation at 30 through passageways provided vertically through the handle 10. At their upper ends, these portions 30 are bent at 32 and recessed in the top of the handle 10 in close parallelism; these portions 32 being in right angled relation to the portions 30 and being exposed on the top of the handle 10, as shown in FIGURES 4 and 5.

The structure of the carrier as above described conforms to the carrier set forth in my above identified co-pending application, but the carrier of this application is additionally provided with means for attachment of a terminal prod of a volt meter in conducting relation with the battery post attaching member or electrode 20, as will be subsequently described.

A standard voltmeter 50 is provided, having the usual operating mechanism therein (not shown) and a pointer 51 normally set to register at the zero (0) marking 52 on the scale 53 which may read for "CHARGE" on the left side and "DISCHARGE" on the right side. The voltmeter 50 includes a casing 55 having a bottom wall 56 to which a terminal prod 57 may be detachably connected upon the wall 56; the same being in the form of a bolt having a head 58 adapted to be placed at the inside of the wall 56; the bolt 57 being externally screw threaded for a portion of its length at 59 below the head 58 for receiving a nut 60 by means of which the prod 57 may be detachably connected to the wall 56 for attachment and connection of the same to a wire 61 of the voltmeter, and within the casing of the voltmeter. The screw threads 59 extend below the nut 60 and the prod 57 extends for a considerable distance below the wall 56 and is provided with a tapered pointed end portion 64.

The prod 57 including its head 58 and nut 60 also serves the purpose of detachably connecting to the bottom wall 56 of the voltmeter a clamp 67 which is of U-shaped cross section and includes a wall portion 68 secured against the wall 56 and spaced depending resilient side clamp walls 69 and 70 which may be bowed outwardly at their lower ends 71. This clamp 67 serves the purpose of attaching the voltmeter to an end of the handle 10. The prod 57 extends downwardly through the channel of the clamp 67 and appreciably extends beyond the end edges of the walls 69 and 70, as shown in FIGURE 4.

The prod 57 may be referred to as the positive post connected prod and, to enable its connection to the metallic battery post attaching member or electrode 20, a hollow bolt 75 is detachably connected upon the handle 10, in the manner shown in FIGURES 4 and 5. This bolt 75 includes a body portion 76 extending through a passageway 77 provided vertically through the handle 10 and at its upper end it is laterally flanged at 78 for overlying and contact engagement with the portions 32 of the battery post attaching member 20. The hollow body 76 extends through the handle 10 and at its lower end is screw threaded at 80 for detachable connection of a nut 81 by means of which the hollow bolt may be connected securely upon the handle. The body 76 is provided with an enlarged socket providing passageway 82 therethrough which narrows into a passageway 83 opening at the lower end of the bolt 76, and internally providing a tapered shoulder 84 against which the tapered end 64 of the prod 57 is adapted to engage to establish a good contact engagement of the prod 57 with the hollow bolt 75.

The voltmeter 50 has another terminal 90 to which a flexible insulated lead wire 91 may be connected as by a nut 92 (FIGURE 4). The wire or line 91 may be of any desired length and at its end, it is provided with a spring actuated attaching clip 95, as shown in FIGURE 2; the clamp ends of the clip being adapted to be connected to a side of the swingable battery post attaching member or electrode 35. This clip 95 is unique in that one side of the same is provided with a pointed prod 96 which is used for engaging a battery post when the voltmeter is to be used independent of attachment to the carrier.

A spring clip 100 may be provided on the case of the electrode 50, as shown in FIGURE 3 for receiving the coiling of the wire 91 either when the voltmeter is not in use on the carrier, or when the carrier is intended for use with small voltage batteries.

The operation of the combination carrier and volt meter will be apparent from the foregoing. It is only necessary for the operator to attach the clip 95 to the post attaching member 35, as shown in FIGURE 2, and then the operator may position the post engaging electrode 20 upon the positive post 105 of the battery; the member 35 being then engaged with the negative post 106 of the battery, as shown in FIGURE 2. The operator grasps the handle to lift the battery and at the same time a glance will serve the purpose of taking the reading on the voltmeter while the battery is being transported or lifted.

It is intended to use the voltmeter independent of the carrier, as above pointed out, and to that end, if the pointed prod 57 is not sufficient an extension prod 110 may be used. It has a passageway 111 therein adapted to receive the prod 57; the upper end of the passageway 111 being internally screw threaded at 112 for attachment to the lower screw threaded end 59 of the prod 57. The prod 110 is pointed at 113.

Since the prod extension 110 is infrequently used, means for socketing it in the handle 10 is provided consisting of a passageway 115 opening at one end of the handle 10 and having a reduced shoulder 116 at the inner end thereof. The prod extension 110 is then forced into the passageway 115; the pointed end frictionally engaging the shoulder 116 and holding the prod in place so that a small end portion of the prod projects from the end of the handle 10, as shown in FIGURE 1, to facilitate extraction.

Various changes in the shape, size and arrangement of parts may be made to the form of invention herein shown and described, without departing from the spirit of the invention or scope of the claims.

I claim:

1. In a combination battery carrier and voltmeter, the combination of a battery carrier comprising an elongated insulated handle, a battery post engaging and connecting member mounted on said handle, said member being of electrically conductive material, a second battery post connecting member of conductive material mounted on said handle in insulated relation with respect to the first mentioned battery post engaging member, said post connecting members having means thereon to grip the battery posts as the handle is lifted, a voltmeter including a casing portion, a scale face, a pointer and operating means for the pointer connected upon said handle with the scale reading facing upwardly, said voltmeter having a pair of terminals, one of which is electrically connected to one of said battery post connecting members and the other terminal being connected conductively to the other battery post connecting member.

2. As an article of manufacture, a battery lifting member comprising a handle of insulation material having a rigid battery post gripping member of electrically conductive material fixedly attached to said handle, a second battery post gripping member of conductive material attached to the handle in insulated relation with respect to the first battery post attaching member, a hollow electrical conductor having a passageway therethrough connected to the first mentioned battery post connecting member in conductive relation therewith, said passageway being opened upwardly on said handle, a voltmeter having means for detachably connecting the same to said handle and being provided with a terminal prod for releasable connection in the passageway of said hollow member in contact therewith, said voltmeter having a second terminal and a flexible lead wire having means at the end thereof for detachable connection with the other battery post connecting member.

3. The combination defined in claim 2 in which said voltmeter is detachably mounted on the handle and provided with a scale reading facing upwardly.

4. The combination defined in claim 3 in which the voltmeter is provided with means to enable the holding of the flexible lead wire of the voltmeter in collapsed coiled relation thereupon.

5. In a combination battery carrier and voltmeter, the combination of a carrier handle, a battery post attaching member mounted on said carrier and being formed of electrically conductive material, a second battery post connecting member mounted on said handle and being of electrically conductive material and insulated from the first battery post connecting member, an electrically conductive socket providing member mounted on the handle in conductive engagement with the first battery post connector member provided with a socket facing upwardly, a voltmeter having means for detachably connecting the same on said handle, said voltmeter being provided with a terminal extension of conductive material for socketing engagement in the socket aforesaid, said voltmeter having a second terminal and an electric lead wire provided with an end having a clamp thereon for detachable connection with the other battery post engaging member.

6. The combination defined in claim 5 in which the clamp is provided with a battery post engaging pointed prong, and a prong extension member having means on the handle for detachably socketing it, said extension member having means thereon for conductive connection with the terminal extension of said voltmeter.

7. In a combination battery carrier and voltmeter, the combination of an elongated handle of insulation material, a battery post attaching member secured to the handle at one end, a second battery post attaching member swingably attached to the handle at a location remote from the first battery post attaching member, both of said battery post attaching members being of electrically conductive material, a voltmeter having a pair of terminals, means for attaching the voltmeter to the handle and connecting one terminal thereof in electrically conducting relation to the first attached battery post connecting member, an electrically conductive flexible wire connected to the other terminal of the voltmeter and said wire having clamping means for connecting it to the swingable battery post connecting member in electrically conductive relation therewith.

8. The combination battery carrier and voltmeter structure as defined in claim 7 in which releasable clamping means is provided upon the volt meter for coiling the flexible wire thereon when its clamp is disengaged with respect to the swingable battery post connecting member.

References Cited by the Examiner

UNITED STATES PATENTS

| | | | |
|---|---|---|---|
| 964,995 | 7/10 | Marko | 324—29.5 XR |
| 1,494,625 | 5/24 | Pierce | 136—182 |
| 1,879,098 | 9/32 | Coffey | 324—29.5 |
| 2,021,178 | 11/35 | Fieberts | 324—29.5 XR |
| 2,081,656 | 5/37 | Anthony | 136—182 |
| 2,225,231 | 12/40 | Pugh | 324—29.5 |
| 2,332,998 | 10/43 | Gantt. | |
| 2,435,549 | 2/48 | Sumter | 136—181 |

OTHER REFERENCES

Voltage Readings on Large Battery Easily Taken by One Man, article in Electrical World, August 20, 1921, page 375.

WALTER L. CARLSON, *Primary Examiner.*